Jan. 19, 1954     A. M. STOTT     2,666,324
STATIC TORSION TESTING MACHINE AND SPECIMEN
Filed June 20, 1951     2 Sheets-Sheet 1
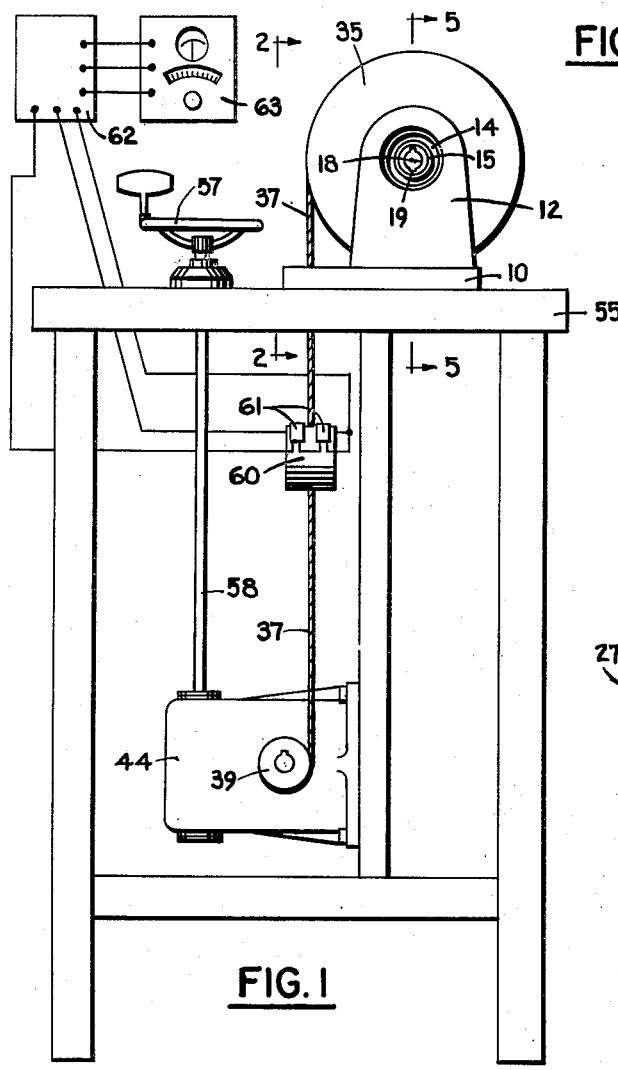
FIG. 1
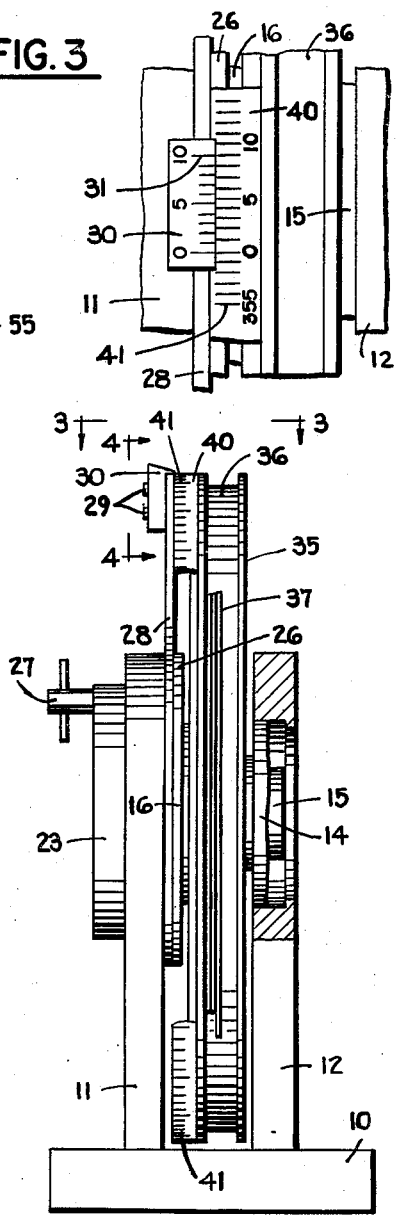
FIG. 3
FIG. 2
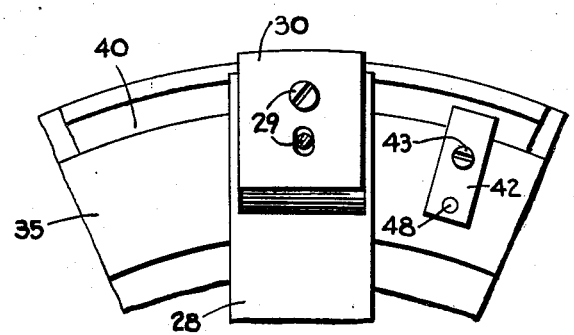
FIG. 4
*INVENTOR.*
ALBERT M. STOTT
BY
*G. J. Kessenich, O. Codier & H. J. Forman*
ATTORNEYS:

Jan. 19, 1954     A. M. STOTT     2,666,324
STATIC TORSION TESTING MACHINE AND SPECIMEN
Filed June 20, 1951     2 Sheets-Sheet 2

*INVENTOR.*
ALBERT M. STOTT
BY
*ATTORNEYS*

Patented Jan. 19, 1954

2,666,324

UNITED STATES PATENT OFFICE 2,666,324

STATIC TORSION TESTING MACHINE AND SPECIMEN

Albert M. Stott, Aldan-Clifton Heights, Pa.

Application June 20, 1951, Serial No. 232,650

7 Claims. (Cl. 73—99)

(Granted under Title 35, U. S. Code (1952), sec. 266)

The invention described herein may be manufactured and used by or for the Government for governmental purposes without payment of any royalty thereon.

My invention pertains broadly to means for testing and measuring the ability of materials to withstand certain strains. In particular, it relates to a static torsion testing machine in combination with a uniquely shaped test specimen therefor. From the title, it is evident that my torsion testing machine is the type in which the test specimen is subjected to a slowly increasing torsional load, as distinguished from kinetic torsion testing machines in which the specimen is subjected to a rapid torsional impact.

It is a well known practice, when desiring to test the physical strength of certain materials, to prepare from the material to be tested a specimen of standard size and shape, according to the type of test being performed. Thus, it has been customary to prepare specimens that are, for example, cylindrical in shape whose ends are adapted for easy fitting into and securing within the testing machine, or specimens, that are of relatively flat cross-section with an elongated hourglass shape. Many other specimen designs are known, but all the prior art models, as well as the conventional static torsion testing machines with which they have been used, have been found to possess certain undesirable features which cause them to be inaccurate and inconsistent in their results. These undesirable features result from the shape of the ends of the specimens, and from the way in which the specimen is mounted in the machine.

In prior art machines, the ends of the specimen are usually placed in a closely confining recess in which an area contact exists between the machine and the ends of the specimen. When positioned in the machine, one or both ends of the specimen are usually clamped. These factors result in pre-loading of the specimen before the test, and in the inability of the ends of the specimen to have any movement during the test. The result of this lack of freedom of movement and the pre-loading condition is the introduction of unknown, extraneous forces which are absorbed, without opportunity for their evaluation, into the magnitude of the stress applied to the specimen. As a consequence the readings obtained from measuring equipment associated with the testing machine are erroneous, because they do not indicate the true stress applied to the test specimen.

My novel static torsion testing machine and specimen combine to eliminate the undesirable features found in conventional types of machines and test specimens, and, at the same time, possess marked points of superiority and inventive progress, as will later be shown. In my testing machine the specimen, which has uniquely shaped ends, is axially slid into an accommodating opening in the machine. Because of the shape of the ends of my test specimen, line contact (as distinguished from area contact of the prior art) exists between the testing machine and the specimen. As will later be shown, this line contact permits swiveling or universal-joint action between the machine and the specimen, and allows the specimen free axial movement during the static torsion testing operation, if so compelled. By thus providing for such movement of the specimen, the extraneous forces which would be introduced during the test, if the ends of the specimen were confined, are allowed to expend themselves, thus preventing them from becoming a factor which would influence a test reading. In my testing machine, also, the specimen is not clamped in place or otherwise pre-loaded before the testing operation. Because of these novel features, the action of my combined static testing machine and specimen is uniform and reliable, and measures the pure torsional strength of the material under test.

One object of my invention is to provide a testing machine in which the test specimen is not clamped or otherwise pre-loaded before the test.

Another object is to provide a static torsion testing machine adapted for rapid insertion and removal of the test specimen.

Yet another object is to provide a static torsion testing machine in which there is universal-joint action between the machine and the ends of the specimen.

A further object is to provide a testing machine and test specimen combination in which line contact exists between the two.

A still further object is to provide a testing machine which will measure pure torsion.

A final object is to provide a static torsion testing machine in which the specimen is allowed free axial movement.

The foregoing and other objects and advantages of my invention will become apparent from an inspection of the following description and the accompanying drawings wherein:

Fig. 1 is an end view of my machine showing its relation to well known, auxiliary electrical equipment used during the test;

Fig. 2 is a front view of my machine, partly in section and partly broken away, taken along line 2—2 of Fig. 1;

Fig. 3 is a partial top view of my machine taken along line 3—3 of Fig. 2 and showing the relation between a vernier and a circular scale forming part of the testing machine;

Fig. 4 is a partial end view taken along line 4—4 of Fig. 2 and showing more details pertaining to the vernier and to the circular scale;

Figure 5:
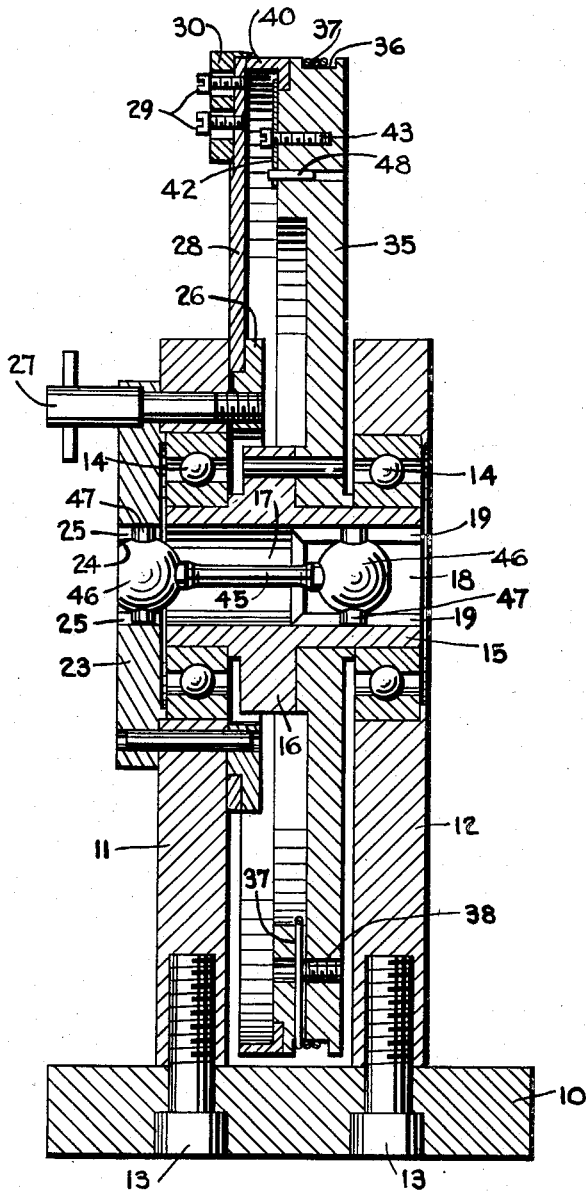
Fig. 5 is a vertical section taken along line 5—5 of Fig. 1 and showing constructional details of my combined machine and specimen.
Figure 6:
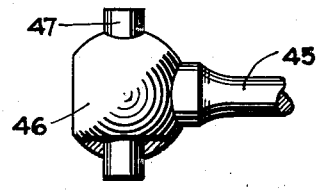
Fig. 6 is a view of one of two substantially identical ends of my novel test specimen.

As seen in Figs. 1, 2, and 5 my testing machine is constructed upon a base 10 to which the vertically extending pillow blocks 11 and 12 are secured in parallel, spaced relationship by means of screws 13 (see Fig. 5). Spanning the space between the pillow blocks, in which blocks it is supported at each end by means of the bearings 14, is a spindle 15. In Fig. 5 it can be seen that the spindle is provided with a flange 16 and with an axial opening 17. This axial opening is provided with a cylindrically shaped specimen-accommodating portion 18 having oppositely located grooves 19.

Secured to the outer surface of pillow block 11 in any convenient manner, and in alignment with spindle 15, is a specimen support plate 23 (see Figs. 2 and 5). As seen in Fig. 5, this plate contains a cylindrical opening 24 which has oppositely located grooves 25 therein. Adjustably secured to the inner surface of pillow block 11 is a clamp ring 26. As evident from that figure, this clamp ring can be drawn to or moved away from the pillow block by means of a clamp stud 27 which threadedly engages the clamp ring.

Rotatably supported upon the clamp ring is a vernier arm 28 to whose outer end is attached, by means of screws 29, an adjustably positioned vernier block 30 having graduations 31 (see Fig. 3). From the construction shown in Fig. 5 it will be apparent that, when clamp ring 26 is loosened, vernier arm 28 can be swung through a wide range of motion. The advantage of this movement will become apparent later. When once set in any desired position, the vernier arm can be clamped there by tightening clamp stud 27.

As shown in Fig. 5, a loading wheel 35 is securely attached, in any convenient manner, to flange 16 of spindle 15 so as to rotate therewith. This loading wheel is provided with a circumferential groove 36 in which is wound a loading cable 37. One end of the loading cable is securely anchored to the loading wheel in any convenient manner, as by means of a set screw 38. The other end of the loading cable passes through an opening (not shown) in base 10 and is secured to the pulley 39 of a gear reducing unit 44 (see Fig. 1). Adjustably located on the loading wheel is a circular scale 40 which has angular graduations 41 (see Figs. 2, 3, and 5). These graduations are in relation to the axis of spindle 15, and will indicate the amount of rotation thereof with reference to fixed vernier 30, during the static torsion test. Scale 40 is held in place on loading wheel 35 by means of scale clamp plates 42 which are held in place by means of screws 43 and dowels 48 (see Figs. 4 and 5).

My novel test specimen consists of a conventionally dimensioned test portion 45, but has unique, essentially spherical ends 46 whose respective centers lie on the test portion's axis. Passing through the center of each spherical end, at right angles to the axis of the specimen, is a cylindrically shaped driving pin 47 which projects from opposite sides beyond the surface of each spherical end. In order to allow for universal-joint action between the ends of the specimen and the testing machine, the specimen's spherical ends are respectively accommodated in either recess 24 of specimen support plate 23 or recess 17 of spindle 15, both of which recesses are in axial alignment with each other. This universal-joint action is further facilitated by having the ends of driving pins 47 sufficiently removed from the bottoms of their respective accommodating grooves. From Fig. 5 it will be evident that, when the test specimen is thus secured in the machine, one end of the specimen will be held against rotation in specimen support plate 23, while the other end of the specimen will be subjected to an increasing torsional moment when loading wheel 35 is rotated.

Figure 7:
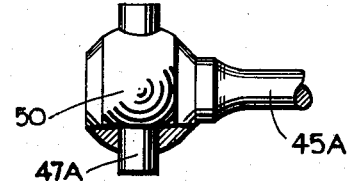
Fig. 7 is a view of one of two substantially identical ends of a modified version of the Fig. 6 specimen.

It is not fully necessary that my uniquely shaped specimen have completely spherical ends. The important requirements for each end are that a spherical zone or band having diametrically opposed cylindrical protuberances exist in such relationship that: the center of the respective spherical zones lies on the axis of the cylindrical test portion, that the bases of the respective spherical zones are equidistant from and parallel to a plane passing through the zone's geometric center perpendicular to the test portion's axis, and that an axis common to the cylindrical protuberances passes through the respective spherical zone's geometric center perpendicular to the test portion's axis. In Fig. 7 I show a modified form of the test specimen which meets these requirements. In that figure a spherical zone 50 has been provided at each end of the test specimen 45A, and the zone possesses diametrically opposed cylindrical protuberances in the form of a drive pin 47A. As also shown in that figure the remainder of the specimen's end portion has been conveniently shaped away from each side of the spherical zone for ready insertion of the specimen into the machine.

As shown in Fig. 1, my inventive static torsion testing machine is mounted upon a bench 55. Secured to the understructure of the bench is the earlier mentioned gear reducing unit 44. This reducing unit is manually operated by means of the hand wheel 57, which is connected to the unit's drive shaft 58. Rotation of the hand wheel causes rotation of the reducing unit's pulley 39 to which the outer end of loading cable 37 is attached. As also shown in that figure, a calibrated ring strain gage 60 is conveniently attached to loading cable 37 in a manner well known to those skilled in the art, and conventional electric strain gages 61 are attached to the ring strain gage. In usual fashion, the electric strain gages are connected through convenient wiring to electronic measuring equipment indicated at 62 and 63.

*Operation of combined machine and specimen*

In practicing my herein disclosed invention the specimen to be tested is axially slid into the machine, from either end, until one end of the specimen is matingly accommodated in support plate 23 and the other end is likewise accommodated in portion 18 of spindle 15 (see Fig. 5). Hand wheel 57 is then rotated until all the slack is out of loading cable 37. After that, clamp stud 27 is loosened and the vernier arm is rotated until the zero mark on the vernier scale coincides with the zero mark on circular scale 40 attached to the loading wheel. When the vernier and the circular scale are so aligned, clamp stud 27 is tightened to hold the vernier arm in place. An optional manner of "zeroing" my testing machine would be to loosen screws 43 of the clamp plates which secure the circular scale of the loading wheel, and then rotate the circular scale in relation to the vernier until the zero marks register with each other. When the zeros of the two scales are in alignment, the screws can be tightened to hold circular scale 40 in proper position.

In order to apply a load to the specimen, hand wheel 57 is turned, thereby rotating pulley 39 of the gear reducing unit. The resulting torque is transmitted by the loading cable to loading wheel 35. This torque, in turn, is transmitted to the spindle, and thence to the end of the specimen contained therein. Since the opposite end of the specimen is fixed against rotation, the specimen is subjected to torsional stress and suffers varying amounts of deflection depending upon the material being tested. The amount of that deflection is indicated by the circular scale as it moves past the vernier, and can be read with great accuracy. Because the load thus applied to the specimen has been passed through strain ring 60, it too will receive a proportional flexural strain. As is well known, the deflection of the strain ring is an index to the amount of torque applied to the specimen. This deflection of the strain ring is picked up by the attached strain gages, and the amount thereof is indicated on a scale forming part of electrical measuring accessory 63. Therefore, during the progress of the torsion test, readings taken from this instrument at intervals can be interpolated, in conventional manner, to indicate the magnitude of the torque applied to the specimen. The loading wheel is caused to rotate gradually until the specimen fractures. By taking a number of readings of the electrical measuring equipment it is possible to determine the amount of load which caused failure in the specimen, and a reading of the vernier and circular scales immediately before the failure can be interpolated to indicate the amount of angular deflection the specimen underwent at the time of failure.

One special advantage of my uniquely shaped specimen is that the spherical end portions thereof permit a universal-joint action, at each end, between the specimen and the testing machine. This universal-joint action allows for self-alignment of the specimen during the test. This property allows extraneous forces, which otherwise would be introduced if the specimen were restrained at each end, as in prior art machines, to expend themselves and not to become an interdeterminable factor which would prevent the accurate calculation of the actual torsional strength of the specimen. Instead, readings taken from the meter forming part of electrical accessory 63 will indicate the pure torsional stress applied to the specimen. In the analytical study of a material's torsional strength, it is most desirable to be able to determine this pure torsional stress, but, until my invention, such accurate determination was impossible because of the shape of the ends of prior art specimens, the manner of mounting those specimens in prior art testing machines, and the resultant area contact between the machines and the specimens.

From the foregoing it will be apparent that I have provided a static torsion testing machine in which the test specimen is not clamped or otherwise pre-loaded prior to the test; that I have provided a static torsion testing machine adapted for rapid insertion and removal of the test specimen; that I have provided a static torsion machine in which there is universal-joint action between the machine and the ends of the specimens; that I have provided a static torsion testing machine and specimen in which line contact exists throughout between the machine and specimen; that I have provided a static torsion testing machine which will measure pure torsion; and that I have provided a static torsion testing machine in which the specimen is allowed free axial movement.

My machine is capable of modification and variation without departing from its original spirit and scope. For example, the same inventive concepts presented here could also be embodied in kinetic torsion machines. For that reason I do not wish to be limited by the single application here discussed for illustrative purposes only, but rather by the breadth and scope of the appended claims.

I claim:

1. In a machine for testing and measuring the ability of materials to withstand gradually increasing torsional loads, when such materials are in the form of a substantially longitudinal test specimen having substantially spherical end portions each with opposed cylindrical protuberances, a horizontal base, a pair of pillow blocks vertically extending in spaced parallel relationship from said base, a hollow cylindrical spindle rotatably mounted across said pillow blocks and bearing a pair of opposed axial recesses in the spindle's interior surface, a support plate secured to one of said pillow blocks and having a cylindrical opening which bears on its interior surface a pair of opposed axial recesses aligned with the corresponding axial recesses in the spindle, the said spindle and support plate each accommodating an end of the test specimen with the opposed cylindrical protuberances on each end fittable into the corresponding aligned axial recesses in said spindle and said support plate, a loading wheel secured to said spindle for rotation therewith and bearing a circumferential groove in its perimeter, a graduated scale affixed to said loading wheel so as to mark off the wheel's perimeter in equidistant divisions, a vernier scale pivotably mounted on one of said pillow blocks and adjacent said graduated scale so as to facilitate accurate reading of the latter scale, a gear reducing unit, a hand wheel for operating said gear reducing unit, a cable attached at one end to said loading wheel for winding in the wheel's circumferential groove and attached at the other end to said gear reducing unit, and strain gauge measuring equipment connected to said cable whereby, upon turning the hand wheel which operates said gear reducing unit, the resulting torque is transmitted by the loading cable to the spindle and the end of the specimen contained therein, the strain gauge equipment enabling measurement of the load thus applied and the scales enabling measurement of the torsional deformation undergone by the specimen.

2. In a machine for testing and measuring the ability of materials to withstand gradually increasing torsional loads, a pair of parallel support members spaced from each other, a hollow cylindrical spindle rotatably bridging said support members, a support plate having a cylindrical opening axially aligned with the hollow interior of said spindle, a loading wheel secured to said spindle for rotation therewith, torsional load applying means, a gear reducing unit, connected to said torsional load applying means, a cable windably secured at one of its ends to the wheel's perimeter and secured at its other end to the gear reducing unit, electrically responsive measuring equipment connected to said cable for determining the amount of torque transmitted thereby from said torsional load applying means through said gear reducing unit to said loading wheel, and graduated scale means mounted on said loading wheel for determining the torsional deformation a test specimen may undergo, whereby, upon mounting a substantially longitudinal specimen of the material to be tested with one end fixed in said spindle and the other end fixed in said support plate, the torsional load applied by said torsional load applying means to the loading wheel is transmitted to the specimen and measurement made of the amount of stress required torsionally to deflect the end of specimen fixed in the spindle a prescribed angular distance from its original position.

3. The machine of claim 2 in which the axially aligned openings in the spindle and support plate are shaped so as to accommodate the substantially spherical ends of a longitudinal specimen, which ends have opposed protuberances extending therefrom, said spindle and support plate opening having opposed recesses in the interior wall surfaces thereof for matingly accommodating in slide-fitting relationship the opposed specimen protuberances.

4. In a static testing apparatus for use with a substantially longitudinal specimen of the material being tested, the specimen having substantially spherical end portions each with cylindrical protuberances opposedly extending therefrom, a rotatably mounted hollow cylindrical spindle whose internal wall surface bears opposed recesses for non-rotatably receiving the cylindrical protuberances at one end of the specimen to be tested by said apparatus, a fixedly mounted support plate having an opening thereinto whose internal wall surface bears opposed recesses for non-rotatably receiving the cylindrical protuberances at the other end of the specimen to be tested by said apparatus, means for supplying a torque to said spindle and thereby transmitting a gradually increasing torsional load to the end of the test specimen which may be supported therein, graduated scale measuring means for determining the rotative distance through which said spindle and any test specimen end which may be carried thereby have been moved, and electrical measuring means connected to said torque supplying means for determining the amount of the torsional load which has been applied by said torque supplying means in rotating the spindle and its contained test specimen end therein a prescribed angular distance from their original position.

5. A test specimen for use with machines for torsion testing of materials, comprising a substantially longitudinal test portion having at each end thereof an enlarged spherical portion whose geometric center lies on the axis of said test portion, and diametrically opposed cylindrical protuberances projecting a substantially equal amount from each said enlarged spherical portion so that the longitudinal axis of each protuberance passes through the geometric center of its respective spherical portion perpendicular to the axis of said test portion.

6. A test specimen for use with machines for torsion testing of materials, comprising a cylindrical test portion having at each end thereof an enlarged spherical portion whose geometric center lies on the axis of said test portion, and a cylindrical pin through each said enlarged spherical portion and projecting at each end a substantially equal amount therefrom at diametrically opposed locations so that the axis of said cylindrical pin passes through the respective spherical portion's geometric center perpendicular to the axis of said test portion.

7. A test specimen for use with machines for torsion testing of materials, comprising a substantially longitudinal test portion having at each end an enlarged portion whose geometric center lies on the axis of said test portion, a spherical band formed on each enlarged portion of said test portion about the respective enlarged portion's geometric center so that the bases of said spherical band are equidistant from and parallel to a plane passing through the band's center and are perpendicular to said test portion's axis, the remainder of each said enlarged portion being relieved away from said spherical band, and a cylindrical drive pin projecting at diametrically opposed places from the respective spherical band a substantially equal amount at each end of the pin so that the drive pin's axis passes through said spherical band's center perpendicular to the axis of said test portion.

ALBERT M. STOTT.

References Cited in the file of this patent
UNITED STATES PATENTS

| Number | Name | Date |
|---|---|---|
| 1,981,960 | Lewis | Nov. 27, 1934 |
| 2,067,140 | Dinzl | Jan. 5, 1937 |